US006265486B1

(12) United States Patent
Shaffer et al.

(10) Patent No.: US 6,265,486 B1
(45) Date of Patent: *Jul. 24, 2001

(54) TRIBLOCK COPOLYMERS INCORPORATING A STYRENE/ISOOLEFIN COPOLYMER MIDBLOCK

(75) Inventors: Timothy Daniel Shaffer, Houston; Hsien-Chang Wang, Bellaire, both of TX (US)

(73) Assignee: Exxon Mobil Chemical Patents Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,448

(22) Filed: Dec. 31, 1998

(51) Int. Cl.$^7$ .................................................. C08L 53/02
(52) U.S. Cl. ............................ 525/98; 525/241; 525/316
(58) Field of Search ............................... 525/98, 241, 316

(56) References Cited

U.S. PATENT DOCUMENTS

| | | | |
|---|---|---|---|
| 3,639,517 | 2/1972 | Kitchen et al. | 260/879 |
| 3,639,521 | 2/1972 | Hsieh | 260/880 |
| 3,985,830 | 10/1976 | Fetters et al. | 260/880 B |
| 4,108,945 | 8/1978 | Fetters et al. | 260/880 B |
| 4,910,321 | 3/1990 | Kennedy et al. | 549/213 |
| 4,946,899 | 8/1990 | Kennedy et al. | 525/244 |
| 5,162,445 | 11/1992 | Powers et al. | 525/333.4 |
| 5,169,914 | 12/1992 | Kaszas et al. | 526/135 |
| 5,219,948 | 6/1993 | Storey et al. | 525/314 |
| 5,350,819 | 9/1994 | Shaffer | 526/189 |
| 5,403,803 | 4/1995 | Shaffer et al. | 502/111 |
| 5,426,167 | 6/1995 | Powers et al. | 526/347 |
| 5,428,111 | 6/1995 | Faust et al. | 525/314 |
| 5,430,118 | 7/1995 | Powers et al. | 526/347 |
| 5,451,647 | 9/1995 | Faust et al. | 526/147 |
| 5,506,316 | 4/1996 | Shaffer | 526/185 |
| 5,548,023 | * 8/1996 | Power et al. | 525/69 |

FOREIGN PATENT DOCUMENTS

| | | |
|---|---|---|
| 0 206 756 | 12/1986 | (EP) . |
| 0 341 012 | 11/1989 | (EP) . |

OTHER PUBLICATIONS

Gábor Kaszás, et al.—"Quasiliving Carbocationic Polymerization. XII. Forced Ideal Copolymerization of Isobutylene with Styrene" *J. Macromol. Sci.–Chem.*, A18(9), pp. 1367–1382 (1982–83).

Györ, M., et al.—"Quasiliving Carbocationic Polymerization. XVI. Forced Ideal Terpolymerizaton of Styrene–α–Methylstyrene–Isobutylene"—*J. Macromol. Sci.–Chem.*, A21(10), pp. 1339–1354 (1984).

Zsolt Fodor, et al.—"Living Carbocationic Polymerization of p–Methylstrene and Sequential Block Copolymerization of Isobutylene with p–Methylstyrene"—*J. Macromol. Sci.–Chem.*, A31(12) pp. 1985–2000 (1994).

WO 96 15156 May 23, 1996.

Kennedy, "Living Carbocationic Copolymerizations.I. Synthesis and Characterization of Isobuytlene/p–Methylstrene Copolymers"—*Journal of Physical Chemistry*, v.8 (1995)—pp. 258–272.

Kennedy, "Living Carbocationic Copolmerizations. II. Reactivity Ratios and Microstructure of Isobutylene/p–Methylstyrene Copolymers"—*Journal of Physical Chemistry*, v.8 (1995)—pp. 273–281.

Derwent Abstract of Japanese Patent JP 06287254 issued Oct. 11, 1994.

* cited by examiner

*Primary Examiner*—James J. Seidleck
*Assistant Examiner*—Olga Asinovsky
(74) *Attorney, Agent, or Firm*—Brent M. Peebles; Joseph F. Reidy; Kevin M. Faulkner

(57) ABSTRACT

Novel triblock copolymers are provided. The triblock copolymers have a midblock which is a copolymer of an isoolefin monomer and a vinyl aromatic monomer. Preferably, the midblock is a copolymer of isobutylene and alkylstyrene. The end blocks of the triblock copolymer are either a homopolymer of a vinyl aromatic monomer or a copolymer of two or more monomers selected from the group consisting of vinyl aromatics, styrene, methylstyrene, butylstyrene, halostyrene, p-allylstyrene and p-3-butenylstyrene. In addition, a process is provided for preparing a triblock copolymer. The process involves:

a) initiating a "living" polymerization of an isoolefin monomer (monomer A) and a first vinyl aromatic monomer (monomer B) in a reaction vessel using carbocationic polymerization conditions and a catalyst capable of carbocationically polymerizing monomer A and monomer B;

b) allowing the polymerization to continue for a period of time $T_1$, during which additional monomer A and/or monomer B may be optionally added;

c) at the completion of time $T_1$, continuing the polymerization by adding only additional monomer A for a period of time $T_2$;

d) at the completion of time $T_2$, continuing the polymerization by adding a second vinyl aromatic monomer (monomer C) for a period of time $T_3$;

e) at the completion of time $T_3$, quenching the polymerization; and f) recovering a triblock copolymer.

14 Claims, No Drawings

TRIBLOCK COPOLYMERS INCORPORATING A STYRENE/ISOOLEFIN COPOLYMER MIDBLOCK

FIELD OF THE INVENTION

The invention generally relates to novel triblock copolymers having a styrene/isoolefin comonomer midblock. The invention also relates to functionalized block copolymers of the above-described. In addition, the invention relates to novel methods of preparing styrene/isoolefin block copolymers and the functionalized block copolymers thereof.

BACKGROUND OF THE INVENTION

Thermoplastic elastomers are an interesting class of materials which bridge the gap between conventional rubber and traditional thermoplastics. Thermoplastic elastomers have properties similar to vulcanized rubber. However, unlike vulcanized rubber they will soften or melt when heated as is characteristic of thermoplastics. Therefore, reprocessing of scrap or unusable components is possible. In addition, thermoplastic elastomers can undergo thermoplastic molding operations such as injection and blow molding. They are more readily extrudable than vulcanizable rubber. Also, they can be utilized in vacuum forming processes or as hot melt adhesives, neither of which is possible with conventional rubber.

The potential of polyisobutylene block copolymers for use as thermoplastic elastomers is well recognized. The properties of the materials are determined by the choice of the monomer for the hard block, the relative molecular weights of the hard and soft segments, and the choice of overall molecular architecture, e.g. linear structure versus a star structure. Despite the many possible structural variations, the choice of monomers compatible with these synthetic methodologies does not facilitate easy access to materials which exhibit hydrophilic character, crosslinking potential, and many other useful chemical functions in addition to rubbery properties. Several methods, as discussed below, have been disclosed for their preparation.

Traditionally, synthesis of thermoplastic elastomers generally involved preparation of diblock copolymers having a rubbery segment and a plastic segment at least one of which remains nonterminated and reactive. Subsequently, a di- or multifunctional compound is added to the non-terminated diblocks combining at least two of the blocks in a head-to-head orientation to produce a linear triblock composition. The product generally comprises a plastic segment connected to a rubbery segment which is, in turn, connected to a plastic segment. The plastic segment is usually a vinyl aromatic or A block, such as polystyrene, while the rubbery segment has in the past usually been a diene or B block, such as polybutadiene or polyisoprene; hence the abbreviation for the linear triblock is ABA.

Preparation via known synthesis of diblocks and the subsequent combining thereof involves anionic polymerization systems, generally organolithium initiated, to form ABLi diblocks which are linked together with a difunctional compound susceptible to carbanion attack such as diisocyanates, divinylbenzene, dibromoethane, epoxidized linseed oil or silicon tetrachloride. Examples of such processes are set forth in U.S. Pat. Nos. 3,639,517 and 3,639,521. When a polyfunctional linking compound is employed, such as silicon tetrachloride, a radial or branched structure results wherein four diblocks are linked together. By controlling the amount of selected difunctional linking compounds such as divinylbenzene or diisocynates, a multifunctional nucleus is developed which can also link together a plurality of ABLi diblocks. Such a process is set forth in U.S. Pat. Nos. 3,985,830 and 4,108,945. More recently, other processes, as set forth below, have been reported.

For instance, living catalysts have been used to polymerize olefins. In a living polymerization, each catalyst molecule initiates a growing polymer chain that does not undergo chain transfer or termination reactions while monomer is present. By comparing the number of initiator molecules with the number of polymer chains produced in the final polymer, one can determine whether or not a living polymerization has occurred. These two numbers should be equivalent to be a true living polymerization. If there are a substantially greater number of chains, then the polymerization is not living. (See U.S. Pat. Nos. 5,506,316 and 5,403,803 which are herein incorporated by reference.) For example, U.S. Pat. No. 5,428,111 ("the '111 patent") discloses a process for the production of block copolymers by: (a) contacting cationically-polymerizable monomer with an initiator to produce living polymer; (b) contacting this with a capping compound selected from the group consisting of diphenyl alkylene, alpha-methoxystyrene, trans-stilbene, 1-isopropenyl-naphthalene, and 2,4-dimethyl-alpha-methylstyrene; and (c) contacting the capped polymer with cationically-polymerizable monomer(s).

The '111 patent also discloses: (i) a method comprising contacting a cationically-polymerizable monomer with a polymer capped with the above compounds; (ii) a block copolymer comprising mid-blocks of isoolefin polymer and end-blocks of aromatic polymers; and (iii) the use of the polymers produced as thermoplastic elastomers. The '111 patent discloses a catalyst composition consisting of a tertiary organic halide, titanium chloride, and a hindered pyridine.

Japanese Pat. Application JO 6287254-A discloses the preparation of block copolymer(s) comprising polymerization of cationically polymerizable vinyl monomer(s) in the presence of a polymerization initiator composed of Lewis acid(s) and compound(s) having a moiety represented by the formula $CR_1R_2R_3$ groups, wherein $R_1$=H, alkyl or aryl; $R_2$=alkyl or aryl; and $R_3$=halogen, alkoxy or acyloxy. The Japanese '254-A patent application abstract discloses a catalyst composition consisting of a tertiary amine, titanium chloride, and an amine.

U.S. Pat. No. 5,451,647 discloses an olefin polymerization process wherein an olefin chargestock is contacted with an organic compound polymerization initiator, a Lewis acid coinitiator and a pyridine compound such as 2,6-di-tert-butylpyridine to produce homopolymers, copolymers or block copolymers having a narrow molecular weight distribution. The '647 patent discloses a catalyst composition consisting of a tertiary organic halide, dimethylaluminum chloride, and a hindered pyridine. Randomly functional polyisobutylenes have been prepared from random, homogenous copolymers of p-methylstyrene ("pMS") and isobutylene using non-living polymerization techniques, subsequent halogenation and functionalization (See U.S. Pat. Nos. 5,430,118; 5,426,167; and 5,162,445 which are incorporated herein by reference). Copolymers with low (<5 mol %) incorporation of pMS are commercially available under the tradename as "XP-50" available from Exxon Chemical Co. U.S. Pat. No. 5,162,445 discloses many ways to functionalize and graft XP-50 into useful rubbery materials. However, the prior art does not explicitly disclose a way to carry out living copolymerization of an isoolefin and pMS followed by sequential addition of styrene based monomers.

Living polymerization of isobutylene and p-methylstyrene has been described by Kennedy in two articles, "Living Carbocationic Copolymerizations. I. Synthesis and Characterization of Isobutylene/p-Methylstyrene Copolymers" (Journal of Physical Organic Chemistry, Vol. 8, pp. 258–272, 1995) and "Living Carbocationic Copolymerizations. II. Reactivity Ratios and Microstructure of Isobutylene/p-Methylstyrene Copolymers" (Journal of Physical Organic Chemistry, Vol. 8, pp. 273–281, 1995). However, these articles do not disclose a way to block polymerize the copolymers. Therefore, a need still exists for a process to produce triblock copolymers having an isoolefin/styrene midblock.

SUMMARY OF THE INVENTION

This need is met by the present invention in which novel triblock copolymers are provided. The triblock copolymers have a midblock which is a copolymer of an isoolefin monomer and a vinyl aromatic monomer. Preferably, the midblock is a copolymer of isobutylene and alkylstyrene. The end blocks of the triblock copolymer are either a homopolymer of a vinyl aromatic monomer or a copolymer of two or more monomers selected from the group consisting of vinyl aromatics, styrene, methylstyrene, butylstyrene, halostyrene, p-allylstyrene and p-3-butenylstyrene. In addition, a process is provided for preparing a triblock copolymer. The process involves:

a) initiating a "living" polymerization of an isoolefin monomer (monomer A) and a first vinyl aromatic monomer (monomer B) in a reaction vessel using carbocationic polymerization conditions and a catalyst capable of carbocationically polymerizing monomer A and monomer B;

b) allowing the polymerization to continue for a period of time $T_1$, during which additional monomer A and/or monomer B may be optionally added;

c) at the completion of time $T_1$, continuing the polymerization by adding additional monomer A only for a period of time $T_2$;

d) at the completion of time $T_2$, continuing the polymerization by adding a second vinyl aromatic monomer (monomer C) for a period of time $T_3$;

e) at the completion of time $T_3$, quenching the polymerization; and f) recovering a triblock copolymer.

DETAILED DESCRIPTION OF THE INVENTION

This invention relates to triblock copolymers, useful in thermoplastic elastomer applications, which contain copolymer midblock segments composed of an isoolefin and a styrenic prepared by "living" cationic polymerization, and a method to obtain them comprising a semi-continuous addition of an isoolefin during the later stages of midblock preparation. For the purposes of this invention, "living" cationic polymerization is defined as polymerization conditions under which control of molecular weight is determined by $DP_n=[M]/[I]$ (where $DP_n$ is the number average degree of polymerization, $[M]$ is the monomer concentration, and $[I]$ is the initiator concentration), leading to a linear relationship between $M_n$ and polymer yield within the scope of experimental error. Chain transfer as well as termination are essentially absent during and following the polymerization through a time which can be 2 to 3 hours or more, more preferably at least 5 minutes, in which further reaction can be effected. By "essentially absent" is meant 15% or less of the chains are permanently affected by chain transfer or termination. Thus a living polymer is a polymer having an active chain end that has not undergone chain termination or chain transfer. This invention further relates to novel compositions produced during and by the method above. This invention further relates to novel compositions prepared by further functionalization of the novel triblock copolymers.

Living polymerization may be achieved using a variety of methods. Some of these methods are described in U.S. Pat. Nos. 5,350,819; 5,403,803; 5,506,316; 5,169,914; 4,910,321; and EP A 206,756 (all of which are herein incorporated by reference). General conditions under which living polymerizations can be achieved for isobutylene include:

(1) a catalyst comprising an initiator of a tertiary alkyl halide, a tertiary aralkyl halide, a tertiary alkyl ether, a tertiary aralkyl ether, a tertiary alkyl ester, a tertiary aralkyl ester, or the like;

(2) a Lewis acid co-initiator which typically comprises a halide of titanium, boron, or aluminum;

(3) a proton scavenger and/or electron donor;

(4) a solvent whose dielectric constant is selected considering the choice of the Lewis acid and the monomer (optionally: monomer/comonomer pair) in accord with known cationic polymerization systems; and (5) monomer (optionally: monomer/comonomer).

A suitable proton scavenger is defined in U.S. Pat. No. 5,350,819. Electron donors have been defined in EP A 341 012. Both of which are herein incorporated by reference.

Because the copolymerizations of the invention of the present application are living, the techniques of living polymerization may be used to make star polymers in addition to linear polymers. Thus, any combination above may be made into a star architecture by proper choice of the initiator.

Any catalyst which is known to be useful for the living polymerization of isoolefins can be used in the present invention. For example, see U.S. Pat. Nos. 5,350,819; 5,403, 803; 5,506,316; 5,169,914; 4,910,321; and EP A 206,756 (all of which are herein incorporated by reference). A preferred catalyst composition comprises: (1) an initiator of a tertiary alkyl halide, a tertiary aralkyl halide or a tertiary polymeric halide, wherein each alkyl group is independently a straight or branched chain alkyl, preferably containing 1 to 15 carbon atoms, each aralkyl is substituted or unsubstituted and wherein the polymeric unit is an olefin polymer; (2) a co-initiator of an alkyl aluminum or alkyl boron wherein the alkyl is a straight or branched chain alky, preferably of 1 to 15 carbon atoms; (3) a proton scavenger; and (4) a solvent.

The amount of catalysts employed will depend on the desired molecular weight and the desired molecular weight distribution of the copolymer being produced. Typically, the range will be from about $1\times10^{-5}$ mol/L to $2\times10^{-2}$ mol/L, and most preferably from $10^{-4}$ to $10^{-1}$ mol/L.

Preferred initiators include tertiary alkyl or aralkyl halides represented by the formula below:

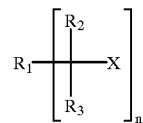

wherein X is a halogen, preferably chloride and $R_1$, $R_2$ and $R_3$ are independently any straight or branched chain alkyls, aryls or aralkyls, preferably containing 1 to 15 carbon atoms, more preferably 1 to 8 carbon atoms, even more preferably 1 to 2 carbon atoms. n is the number of initiator sites and is a number greater than or equal to 1, preferably 1 to 6. The aralkyls may be substituted or unsubstituted. Preferred examples include 2-chloro-2,4,4-trimethylpentane (TMPCl), 1,3,5 tri(1-chloro-1-methyl-ethyl) benzene and 5-tert-butyl-1,3-di(1-chloro-1-methylethyl) benzene (TBDCC). Other suitable initiators can be found in U.S. Pat. No. 4,946,899, which is herein incorporated by reference. For the purposes of this invention and any claims thereto, aralkyl is defined to mean a compound containing both aromatic and aliphatic structures.

Another preferred initiator is a tertiary polymeric halide, one of $R_1$, $R_2$ or $R_3$ is an olefin polymer and the remaining R groups are defined as above. Preferred olefin polymers include polyisobutlyene and polypropylene. The polymeric initiator may have halogenated tertiary carbon positioned at the chain end or along or within the backbone of the polymer. When the olefin polymer has multiple halogen atoms at tertiary carbons, either pendant to or within the polymer backbone, the product polymer may have a comb like structure and/or side chain branching depending on the number and placement of the halogen atoms in the olefin polymer. Likewise, the use of a chain end tertiary polymeric halide initiator provides a method for producing block copolymers. Monomer added to the polymeric initiator will form a second block. Successive blocks can be formed by sequential monomer addition.

The preferred co-initiator is a dimethylaluminum halide or dimethylboron halide, preferably dimethylaluminum chloride or dimethylboron chloride.

Suitable solvents include hydrocarbons, especially hexanes and heptanes, halogenated hydrocarbons, especially chlorinated hydrocarbons and the like. Specific examples include but are not limited to hexane, heptane, methyl cyclohexane, ethyl cyclohexane, propyl cyclohexane, methyl chloride, methylene chloride, ethyl chloride, propyl chloride, butyl chloride, chloroform and the like.

For the purposes of this invention and the claims thereto a proton scavenger is defined to be a composition capable of reacting with free protons and not producing a new species of catalyst or if it does produce a new species of catalyst, that catalyst is substantially inactive when compared to the catalyst system of this invention. Preferred proton scavengers are 2,6-di-tert-butylpyridine (DTBP), 4-methyl-2,6-di-tert-butylpyridine, 1,8-bis(dimethylamino)naphthalene or diisopropylethylamine used alone or in combination.

The polymerization may be conducted in any suitable conventional vessel or reactor such as those used in the manufacture of butyl rubber or isobutylene/paramethylstyrene copolymers. The reaction is conducted at temperatures below 0° C. and preferably in the range of −10° C. to about −115° C. and for a period of time sufficient to produce copolymers of the desired molecular weight, e.g., from less than one minute to 5 hours, more preferably from about 5 to 60 minutes. The polymerization reaction may be terminated by adding a quenching agent such as a lower alkyl alcohol, followed by recovery and washing the polymer product. Suitable reactors and reaction conditions for preparing copolymers of this invention are more particularly described in U.S. Pat. No. 5,162,445, the disclosure of which is incorporated herein by reference.

According to one embodiment, the present invention is directed to novel styrene/isoolefin triblock copolymers comprising styrene end blocks and isoolefin midblocks prepared by a living carbocationic polymerization process utilizing an alkylstyrene comonomer, wherein the isoolefin midblocks and, optionally, the styrene end blocks have alkylstyrene comonomer incorporated therein.

Utilizing the present invention, many options exist for the preparation of triblock copolymers with random copolymer building blocks, for example (but not limited to) the following: polystyrene-b-poly(isobutylene-co-p-methylstyrene)-b-polystyrene; poly(styrene-co-p-methylstyrene)-b-poly(isobutylene-co-p-methylstyrene)-b-poly(styrene-co-p-methylstyrene); poly(p-t-butylstyrene)-b-poly(isobutylene-co-p-methylstyrene)-b-poly(p-t-butylstyrene); and poly(p-t-butylstyrene-co-p-methylstyrene)-b-poly(isobutylene-co-p-methylstyrene)-b-poly(p-t-butylstyrene-co-p-methylstyrene).

Also, because of the incorporation of alkylstyrene and/or alkenylstyrene, according to the invention, derivatives may be prepared by halogenation, functionalization or grafting as known in the art and are included within the scope of the present invention. The midblock and/or the endblocks may be functionalized. Functionalized versions of the copolymers of the present invention may be prepared by conventional chemical reactions. In the case of alkenylstyrenes, functionalization reactions may include heating a selected reactive reagent with the alkenylstyrene polymer or addition reactions such as epoxidation, halogenation, Diels-Alder cyclization and similar reactions involving the pendant alkenyl moiety. Typical specific functional groups, the general reaction type and typical reagents for achieving a representative number of different functionalized copolymers are listed in Table A.

TABLE A

| Functional Group Type | Generic Structure | Reaction Type, Typical Reagents |
|---|---|---|
| Halides | P—C(X)—C(H)— | Hydrohalogenation, e.g. HBr |
|  | P—C(H)—C(X)— | Radical Hydrohalogenation, e.g. HBr/peroxide |

TABLE A-continued

| Functional Group Type | Generic Structure | Reaction Type, Typical Reagents |
|---|---|---|
| | P—C(X)—C(X) | Electrophilic halogenation, e.g. $Br_2$ |
| | P—C(HO)—C(X) | Hydroxyhalogenation, e.g. $Br_2/H_2O$ |
| | P—C(RO)—C(X) | Alkoxyhalogenation, e.g. $Br_2$, ROH |
| Amines | P—C(H)—C(NH$_2$) | Hydroboration-amination, $BH_3/NH_2SO_3H$<br>Ammonical hypochlorite, $NH_4OH/NaOCl$ |
| Ethers | P—C(RO)—C(H) | Solvomercuration-demercuration, e.g. 1. ROH, $Hg(O_2CCF_3)_2$, 2. $NaBH_4$, NaOH |
| | P—C(—O—)C (epoxide) | Epoxidation, e.g. m-chloroperoxybenzoic acid |
| Alcohols | P—C(HO)—C | Hydration, e.g. cat. $H^+$, $H_2O$<br>Oxymercuration-demercuration, e.g. 1. $Hg(OAc)_2$, $H_2O$ 2. NaBH4, NaOH |
| | P—C(H)—C(OH) | Hydroboration-oxidation, e.g. 1. $HBV(R)_2$, 2. $H_2O_2$, NaOH |
| Diols | P—C(HO)—C(OH) | Cis hydroxylation, e.g. $KMnO_4$, phase transfer catalyst, cold |
| Ketones | P—C(=O)—C | Oxidation, e.g. $PdCl_2$, CuCl, $O_2$ |
| Cyclics | P—C—C (cyclohexene with $(R)_n$) | Diels Alder (R = additional structures including functional groups) e.g. cyclopentadiene |

P = polymer

These functionalized block copolymers may offer improved adhesion as well as alternative methods of curing, including UV radiation, e-beam radiation, free radical and carbocationic chemistries, compared to unfunctionalized block copolymers. Consequently, these materials can be used in adhesive, coating and polymer blend applications for molded goods and tire components.

The triblock copolymers of the present invention have a midblock and endblocks. The midblock is a copolymer of an isoolefin or mixture of isoolefins and one or more vinyl aromatic monomers. Preferably, the isoolefin is selected from the group consisting of $C_4$ to $C_{18}$ isoolefins and mixtures thereof. More preferably, the isoolefin is isobutylene, 2-methyl-1-butene or 2-methyl-1-pentene. Most preferably, the isoolefin is isobutylene.

Preferably, the vinyl aromatic monomer in the midblock is selected from the group consisting of $C_8$ to $C_{20}$ styrenics, $C_8$ to $C_{20}$ halostyrenics and mixtures thereof More preferably, the vinyl aromatic monomer in the midblock is selected from the group consisting of $C_8$ to $C_{20}$ alkylstyrenics, $C_8$ to $C_{20}$ nonconjugated alkenyl styrenics, $C_8$ to $C_{20}$ haloalkylstyrenics, $C_8$ to $C_{20}$ nonconjugated haloalkenylstyrenics and mixtures thereof Still more preferably, the vinyl aromatic monomer in the midblock is selected from the group consisting of methylstyrene, butylstyrene, halostyrene, allylstyrene and 3-butenylstyrene. Still more preferably, the vinyl aromatic monomer in the midblock is selected from the group consisting of p-methylstyrene, p-allylstyrene and p-3-butenylstyrene. Most preferably, the vinyl aromatic monomer in the midblock is paramethylstyrene.

The endblocks of the triblock copolymers of the present invention are either homopolymers or copolymers of one or more vinyl aromatic monomers. These vinyl aromatic monomers can be the same or different than the vinyl aromatic monomer used in the midblock. Preferably, at least one is different. The vinyl aromatic monomer(s) in the endblocks is preferably selected from the group consisting of $C_8$ to $C_{20}$ styrenics, $C_8$ to $C_{20}$ halostyrenics and mixtures thereof. When the end blocks are homopolymers, the vinyl aromatic monomer is preferably styrene. When the end blocks are copolymers, one of the monomers is preferably styrene and the other monomer(s) are preferably selected from the group consisting of $C_8$ to $C_{20}$ alkylstyrenics, $C_8$ to $C_{20}$ nonconjugated alkenyl styrenics, $C_8$ to $C_{20}$ haloalkylstyrenics, $C_8$ to $C_{20}$ nonconjugated haloalkenylstyrenics and mixtures thereof. More preferably, the other monomer(s) is selected from the group consisting of methylstyrene, butylstyrene, halostyrene, allylstyrene and 3-butenylstyrene. Still more preferably, the other monomer(s) is selected from the group consisting of p-methylstyrene, p-allylstyrene and p-3-butenylstyrene. Most preferably, the other monomer(s) is paramethylstyrene.

The process for producing the triblock copolymers of the present invention can generally be described using the following schematic:

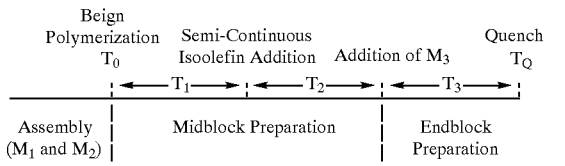

Wherein $M_1$ is the isoolefin or mixture of isoolefins used in the midblock and $M_2$ is the vinyl aromatic monomer or mixture of vinyl aromatic monomers used in the midblock. They may be combined either as a batch mixed feed or as a semi-continuous addition of $M_2$ prior to $T_1$. $T_1$ is preferably the time required to achieve 20 to 80% conversion of the initial charge. Semi-continuous addition of the isoolefm begins at the end of $T_1$. The amount of isoolefin may range from 10 to 90% of the required isoolefin for desired midblock length.

$T_2$ is preferably the time required to reach at least 95% conversion of the midblock monomers. Sequential addition of $M_3$ to form the endblocks begins at the end of $T_2$. $T_3$ is the amount of time used for endblock formation. $M_3$ is the monomer or mixture of monomers that comprise the endblocks. The addition of $M_3$ may be a single batch addition or a semi-continuous addition. $T_Q$ is defined as the time at which the desired end block $M_3$ conversion has been reached.

According to one embodiment, the present invention is directed to novel styrene/isoolefin triblock copolymers comprising styrene end blocks and isoolefin midblocks prepared by a living carbocationic copolymerization process utilizing an alkylstyrene comonomer, wherein the isoolefin midblocks have alkylstyrene comonomer randomly and/or homogeneously incorporated therein. For example, according to several embodiments, the invention of the present application is directed to novel copolymers comprises blocks of (i) poly(styrene-co-alkylstyrene)-poly(isoolefm-co-alkylstyrene)-poly(styrene-co-alkylstyrene) or (ii) polystyrene-poly(isoolefin-co-alkylstyrene)-polystyrene. Preferably, according to one embodiment, the alkylstyrene is para-methylstyrene and the isoolefin is isobutylene.

According to another embodiment, the present invention is directed to novel polystyrene-poly(isobutylene-co-p-methylstyrene)-polystyrene, poly(styrene-co-p-methylstyrene)-poly(isobutylene-co-p-methylstyrene)-poly(styrene-co-p-methylstyrene), poly(p-t-butylstyrene)-b-poly(isobutylene-co-p-methylstyrene)-b-poly(p-t-butylstyrene), and poly(p-t-butylstyrene-co-p-methylstyrene)-b-poly(isobutylene-co-p-methylstyrene)-b-poly(p-t-butylstyrene-co-p-methylstyrene) triblock copolymers.

Utilizing the method of the invention described above, triblock copolymers may be synthesized which have: (1) a molecular weight distribution of about 1.0 to about 2.5, (2) molecular weights of about 1000 to about 30,000, (3) about 0.1% to about 65% by weight styrenics in the isoolefin block, and (4) about 0.5% to about 50% by weight polystyrene end blocks (including the alkylstyrene incorporation).

As is understood in the art, the amounts of isoolefin monomer and alkylstyrene comonomer utilized in the practice of the processes of the present invention and which process is utilized depends upon the desired final properties of the polymer.

The triblock copolymers of the present invention can be used in a variety of applications, including hot melt adhesives, elastic films and fibers, dynamic vulcanizates, tire treads and sidewalls, innerliners, medicinal stoppers and other molded articles.

The invention, while not meant to be limited thereby, can be better understood by reference to the following examples.

EXAMPLES

Example 1

A mixed monomer feed copolymerization was prepared with 2 mol % pMS. A solution of hexane (42 ml), methyl chloride (28 ml), 110 microliters of dimethyl phthalate and 0.72 ml of dimethylaluminum chloride was prepared at −90° C. This mixture was allowed to age 5 to 10 minutes. After this time, 14 ml of isobutylene and 0.47 ml of pMS were added and dissolved. The solution was once again allowed to age 3 to 5 minutes. After testing for the absence of polymerization, 22 microliters of 2-chloro-2,4,4-trimethylpentane was added to initiate the polymerization. Samples were extracted over time and analyzed for $M_n$, mol % pMS and % BSB. The polymerization and aliquots were quenched with methanol addition. A plot of $M_n$ versus conversion is linear with the polymer collected at the end of this run exhibiting a $M_w/M_n$=1.30 and an $M_n$ of 37,800. The incorporation of pMS is at a level higher than the feed ratio at this stage in the polymerization, but does not vary with conversion in this conversion range. Over this range, % BSB (a measure of the isolated pMS repeat units in the chain) increases during the course of the polymerization. However, in all cases, the UV trace and the RI trace of GPC chromatograms perfectly overlay each other confirming the homogeneity of the pMS incorporation.

Example 2

The quantities and procedures for the polymerization are as those described above, except that pMS is not added to the solution before polymerization is initiated. One minute after initiation, however, 1 ml of a 0.9 mol/L solution of pMS in a 60/40 v/v hexane/methyl chloride solution is added. Additional amounts of comonomer are added in 0.6 ml quantities of this same solution at 5, 10, 15, 20 and 30 minutes into the polymerization. The $M_n$ versus conversion plot is linear with the final polymer having a $M_n$=57,500 and a $M_w/M_n$=1.28. Although this manner of addition does not effect the living nature of the polymerization, the mol % pMS and % BSB trends are different. Mol % pMS increases over the course of the polymerization, but the % BSB values tend to remain constant and higher than in Example 1. At all times, the UV and RI traces of the GPC chromatograms are superimposable.

Examples 1 and 2 show that an XP-50 mid-block can be prepared and since the polymerizations are living, sequential addition of a styrenic monomer can be used to prepare the triblock copolymers. Therefore, copolymerizations of pMS with styrene are less difficult to manage in regard to random incorporation.

Example 3

In a dry box, a 5 liter reactor, cooled to −90° C., was charged with 308 ml of hexane (sodium-benzophenone ketal dried and distilled), 205 ml of methyl chloride (dried by passing the gas through two columns of barium oxide, condensing and collecting the liquid in a dry box), 3 microliters of dimethylphthalate, and 3.35 ml of dimethylaluminum chloride. This solution was allowed to age for 15 minutes. 58 ml of isobutylene (dried by passing the gas through two columns of barium oxide, condensing and collecting the liquid in the dry box) was added and dissolved. The solution was again allowed to age 15 minutes. Separately, two additional solutions were prepared and added to cooled addition funnels. In the first, 57 ml of isobutylene and 103 ml of methyl chloride were combined. In the second, 110 ml of hexane, 73 ml of methyl chloride, and 50 ml of styrene (dried and distilled from calcium hydride) were combined. The polymerization was started by adding 3.6 ml of p-methylstyrene (dried and distilled from calcium hydride) which was dissolved in an equal amount of methyl chloride, to the stirred reactor followed by a solution of 0.325 g of 1,3-bis(1-chloro-1-methylethyl)-5-tert-butylbenzene in 5 ml of methyl chloride. After five minutes of polymerization, the isobutylene solution from the first cooled addition funnel was added at a rate of 32 milliliters per minute. Eleven minutes after the beginning of the polymerization and after the complete addition of isobutylene, styrene was added to the reactor from the cooled addition funnel at a rate of 33 milliliters per minute. The reaction was quenched after thirty minutes of total polymerization time by adding chilled methanol. The polymer solution was allowed to warm and solvents permitted to weather off. The polymer was isolated by precipitating into methanol, separating the solid polymer from the liquid and drying the polymer in vacuo. The polymerization yielded 110 grams of triblock copolymer.

A sample taken just before styrene addition was characterized to determine the characteristics of the midblock including copolymer composition, % BSB triads, $M_n$ and $M_w/M_n$. From $^1$H-NMR spectra, the midblock contained 1.76 mol % pMS with 37% BSB. From GPC analysis, $M_n$ was 62,800 and the $M_w/M_n$ was 1.3.

The final copolymer was characterized for overall $M_n$, $M_w/M_n$ and wt. % polystyrene. From $^1$H-NMR analysis (taking into account the p-methylstyrene incorporation), the final triblock contained 26 wt. % polystyrene. The $M_n$ profile of the triblock is calculated to be 11,000 for each polystyrene block and 62,800 for the midblock. GPC analysis gives a $M_n$ of 90,500 and an overall $M_w/M_n$ of 1.9. The triblock exhibited a tensile stress of 16 MPa and a 718% elongation at break.

Example 4

105 grams of the triblock copolymer from Example 3 was dissolved into 700 ml of cyclohexane. This solution was washed with water until the pH was 7.0. The cyclohexane solution was separated and additional water removed by azeotropic distillation using a Dean-Stark trap until the temperature of the vapor was the same as that of pure cyclohexane. Once the solution was dried in this fashion, it was cooled to room temperature. At this temperature, 4.45 grams of bromine were added. This solution was stirred and exposed to a high intensity lamp for 86 minutes. At the end of this time, a saturated solution of potassium carbonate was added to quench any remaining bromine. The polymer was isolated by precipitating into acetone, separating the liquid from the polymer and drying the polymer in vacuo. According to $^1$H-NMR analysis, the triblock contains 0.56 mol % of p-bromomethylstyrene units in the midblock.

Comparative example 1

In a dry box, a 5 liter reactor, cooled to −90° C., was charged with 18 ml of hexane (sodium benzophenone ketal dried and distilled), 12 ml of methyl chloride (dried by passing the gas through two columns of barium oxide, condensing and collecting the liquid in the dry box), 56 microliters of dimethylphthalate, and 0.29 ml of dimethylaluminum chloride. This solution was allowed to age 10 minutes with stirring. Isobutylene, 5 ml, (dried by passing the gas through two columns of barium oxide, condensing and collecting the liquid in the dry box) along with 0.17 ml of p-methylstyrene (dried by distillation from calcium hydride) was added and dissolved. The solution was again allowed to age two minutes. Separately, a stock solution of 3.6 ml of styrene (dried by distillation from calcium hydride) 10.8 ml of hexane and 7.2 ml of methyl chloride was prepared and chilled to −90° C. The polymerization was started by adding a solution of 13 milligrams of 1,3-bis(1-chloro-1-methylethyl)-5-tert-butylbenzene in 5 ml of methyl chloride. After 20 minutes of polymerization, 2.0 ml of the styrene solution was added. Styrene solution was also added at 25 minutes (4.8 ml of solution), 30 minutes (5 ml of solution), 35 minutes (5 ml of solution), and 40 minutes (the remainder of the solution) into the polymerization. The reaction was quenched after 80 minutes of polymerization. The polymer was isolated by precipitating into methanol, separating the solid polymer from the liquid, and drying the polymer in vacuo. The polymerization yielded 3.4 grams of polymer.

A sample taken just before the first styrene addition was characterized to determine the characteristics of the midblock. From $^1$H-NMR spectra, the midblock contained 1.8 mol % pMS with 45 mol % BSB triads. From GPC analysis, $M_n$ was 108,600 and the $M_w/M_n$ was 1.4. The final copolymer was also characterized by these techniques. From $^1$H-NMR analysis (taking into account the pMS incorporation), the final copolymer contained 4.0 wt. % polystyrene. GPC analysis gives a $M_n$ of 118,400 and an overall $M_w/M_n$ of 1.4. The polymer had no appreciable mechanical strength.

Comparative example 2

In a dry box, a 5 liter reactor, cooled to −90° C., was charged 18 ml of hexane (sodium benzophenone ketal dried and distilled), 12 ml of methyl chloride (dried by passing the gas through two columns of barium oxide, condensing and collecting the liquid in the dry box), 56 microliters of dimethylphthalate, and 0.13 ml of dimethylaluminum chloride. This solution was allowed to age 10 minutes with stirring. Isobutylene, 4.5 ml, (dried by passing the gas through two columns of barium oxide, condensing and collecting the liquid in the dry box) along with 0.15 ml of p-methylstyrene (dried by distillation from calcium hydride) was added and dissolved. The solution was again allowed to age three minutes. Separately, a stock solution of styrene was prepared by combining 7.1 ml of hexane, 4.7 ml of methyl chloride and 8 microliters of dimethylaluminum chloride at −90° C. and aging this solution 20 minutes. 2.3 ml of styrene (dried by distillation from calcium hydride) was then added. The polymerization was started by adding a solution of 12 milligrams of 1,3-bis(1-chloro-1-methylethyl)-5-tert-butylbenzene in 5 ml of methyl chloride. After 20 minutes of polymerization, 4.0 ml of the styrene solution was added. Styrene solution was also added at 23 minutes (4 ml of solution), and 26 minutes (the remainder of the solution). The reaction was quenched after 80 minutes of polymerization. The polymer was isolated by precipitating into methanol, separating the solid polymer from the liquid, and drying the polymer in vacuo.

A sample taken just before the first styrene addition was characterized to determine the characteristics of the midblock. From $^1$H-NMR spectra, the midblock contained 1.2 mol % pMS with 58 mol % BSB triads. From GPC analysis, $M_n$ was 56,600 and the $M_w/M_n$ was 1.3.

The final copolymer was also characterized by these techniques. From $^1$H-NMR analysis (taking into account the pMS incorporation), the final copolymer contained 2.1 wt.% polystyrene. GPC analysis gives a $M_n$ of 75,600 and an overall $M_w/M_n$ of 1.3. The polymer had no appreciable mechanical strength.

While certain representative embodiments and details have been shown for the purposes of illustrating the invention, it will be apparent to those skilled in the art that various changes in the process and products disclosed herein may be made without departing from the scope of the invention, which is defined in the appended claims.

We claim:

1. A triblock copolymer comprising:
   a midblock comprising a first copolymer of an isoolefin monomer and a first vinyl aromatic monomer; and
   end blocks comprising either a homopolymer of a second vinyl aromatic monomer or a second copolymer of two or more vinyl aromatic monomers.

2. The triblock copolymer of claim 1 wherein said first copolymer has a functional group selected from the group consisting of one or more halides, amines, ethers, alcohols, diols, ketones, and cyclics.

3. The triblock copolymer of claim 1 wherein said end blocks comprise said homopolymer.

4. The triblock copolymer of claim 3 wherein said homopolymer has a functional group selected from the group consisting of one or more halides, amines, ethers, alcohols, diols, ketones, and cyclics.

5. The triblock copolymer of claim 1 wherein said end blocks comprise said second copolymer.

6. The triblock copolymer of claim 5 wherein said second copolymer has a functional group selected from the group consisting of one or more halides, amines, ethers, alcohols, diols, ketones, and cyclics.

7. A process for preparing a triblock copolymer comprising:
   a) initiating a "living" polymerization of an isoolefin monomer (monomer A) and a first vinyl aromatic monomer (monomer B) in a reaction vessel using carbocationic polymerization conditions and a catalyst capable of carbocationically polymerizing monomer A and monomer B;
   b) allowing the polymerization to continue for a period of time $T_1$ required to achieve 20 to 80% conversion of an initial charge, during which additional monomer A and/or monomer B is optionally added;
   c) at the completion of time $T_1$, continuing the polymerization by adding only additional monomer A for a period of time $T_2$ required to reach at least 95% conversion of a midblock monomer;
   d) at the completion of time $T_2$, continuing the polymerization by adding a second vinyl aromatic monomer (monomer C) for a period of time $T_3$ required to form an endblock;
   e) at the completion of time $T_3$, quenching the polymerization; and
   f) recovering said triblock copolymer.

8. The process claim 7 wherein said isoolefin is selected from the group consisting of $C_4$ to $C_{18}$ isoolefins and mixtures thereof.

9. The process of claim 7 wherein said first vinyl aromatic monomer is selected from the group consisting of $C_8$ to $C_{20}$ styrenics, $C_8$ to $C_{20}$ halostyrenics and mixtures thereof.

10. The process of claim 7 wherein said second vinyl aromatic monomer is selected from the group consisting of $C_8$ to $C_{20}$ styrenics, $C_8$ to $C_{20}$ halostyrenics and mixtures thereof.

11. The process of claim 7 wherein said isoolefin is isobutylene, said first vinyl aromatic monomer is paramethylstyrene and said second vinyl aromatic monomer is styrene.

12. The process of claim 7 wherein at the completion of time $T_2$, the polymerization is continued by adding a second vinyl aromatic monomer (monomer C) and a comonomer (monomer D) for a period of time $T_3$.

13. The process of claim 12 wherein said comonomer is selected from the group consisting of $C_8$ to $C_{20}$ styrenics, $C_8$ to $C_{20}$ halostyrenics and mixtures thereof.

14. The triblock copolymer of claim 1 wherein the vinyl aromatics are selected from the group consisting of one or more styrenes, methylstyrenes, butylstyrenes, halostyrenes, p-allylstyrenes and p-3-butenylstyrenes.

* * * * *